US010569727B2

(12) United States Patent
Shintani et al.

(10) Patent No.: US 10,569,727 B2
(45) Date of Patent: Feb. 25, 2020

(54) MOBILE UNIT CONTROL DEVICE AND MOBILE UNIT

(71) Applicant: HONDA MOTOR CO., LTD., Tokyo (JP)

(72) Inventors: Tomoko Shintani, Wako (JP); Hiromitsu Yuhara, Wako (JP); Eisuke Soma, Wako (JP); Shinichiro Goto, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 134 days.

(21) Appl. No.: 15/719,825

(22) Filed: Sep. 29, 2017

(65) Prior Publication Data

US 2018/0093625 A1    Apr. 5, 2018

(30) Foreign Application Priority Data

Sep. 30, 2016 (JP) ................................. 2016-193789

(51) Int. Cl.
*B60R 16/037*    (2006.01)
*G06K 9/00*    (2006.01)

(52) U.S. Cl.
CPC ........ *B60R 16/037* (2013.01); *G06K 9/00302* (2013.01); *G06K 9/00597* (2013.01); *G06K 9/00845* (2013.01)

(58) Field of Classification Search
CPC .............. B60R 16/037; G06K 9/00302; G06K 9/00597; G06K 9/00845
See application file for complete search history.

(56) References Cited

U.S. PATENT DOCUMENTS

| 7,190,283 | B1* | 3/2007 | Varian | G08G 1/164 |
| | | | | 340/436 |
| 9,229,905 | B1* | 1/2016 | Penilla | G06F 17/00 |
| 9,365,188 | B1* | 6/2016 | Penilla | B60R 25/2018 |

(Continued)

FOREIGN PATENT DOCUMENTS

| CN | 104228817 A | 12/2014 |
| CN | 104282164 A | 1/2015 |
| CN | 104354701 A | 2/2015 |

(Continued)

OTHER PUBLICATIONS

Office Action dated Mar. 20, 2018, issued in counterpart Japanese Application No. 2016-193789, with English machine translation. (6 pages).

(Continued)

*Primary Examiner* — Mussa A Shaawat
(74) *Attorney, Agent, or Firm* — Westerman, Hattori, Daniels & Adrian, LLP

(57) ABSTRACT

A mobile unit control device is installed in a vehicle and includes a user detector that detects a user located within a first predetermined distance from the vehicle; a sight line detector that detects the direction of the sight line of the user detected by the user detector; and a response controller that performs interest response processing of, when the sight line detector detects that the sight line of the user is directed toward the vehicle, actuating an accessory (e.g., headlights, tail lamps) provided in the vehicle to change in a manner recognizable from outside the vehicle.

18 Claims, 6 Drawing Sheets

(56) References Cited

U.S. PATENT DOCUMENTS

| | | | | |
|---|---|---|---|---|
| 2012/0262582 | A1* | 10/2012 | Kimchi | H04M 1/72569 |
| | | | | 348/159 |
| 2014/0195074 | A1* | 7/2014 | Hunt | B60W 50/08 |
| | | | | 701/2 |
| 2015/0210287 | A1* | 7/2015 | Penilla | B60W 40/08 |
| | | | | 701/49 |
| 2016/0170487 | A1* | 6/2016 | Saisho | G01C 21/3635 |
| | | | | 345/156 |
| 2016/0247394 | A1* | 8/2016 | Stenneth | G08G 1/0112 |
| 2017/0067385 | A1* | 3/2017 | Hunt | B60W 40/09 |
| 2017/0270490 | A1* | 9/2017 | Penilla | G06Q 10/1095 |
| 2018/0053093 | A1* | 2/2018 | Olabiyi | G06N 3/088 |
| 2018/0053108 | A1* | 2/2018 | Olabiyi | G06N 3/084 |
| 2018/0059913 | A1* | 3/2018 | Penilla | B60N 2/0228 |
| 2018/0290627 | A1* | 10/2018 | Hariri | B60R 25/245 |
| 2018/0338241 | A1* | 11/2018 | Li | H04L 12/2809 |
| 2019/0056745 | A1* | 2/2019 | Meehan | G05D 1/0234 |

FOREIGN PATENT DOCUMENTS

| | | |
|---|---|---|
| JP | 2002-323900 A | 11/2002 |
| JP | 2004-233175 A | 8/2004 |
| JP | 2008-85613 A | 4/2008 |
| JP | 2013-237124 A | 11/2013 |

OTHER PUBLICATIONS

Office Action dated Oct. 23, 2019, issued in counterpart CN application No. 201710657759.0.

Search Report dated Oct. 15, 2019, issued in counterpart CN application No. 2017106577590. (1 pages).

* cited by examiner

MOBILE UNIT CONTROL DEVICE AND MOBILE UNIT

CROSS REFERENCES TO RELATED APPLICATIONS

The present application claims priority under 35 U.S.C. § 119 to Japanese Patent Application No. 2016-193789, filed Sep. 30, 2016, entitled "Mobile Unit Control Device and Mobile Unit." The contents of this application are incorporated herein by reference in their entirety.

TECHNICAL FIELD

The present disclosure relates to a mobile unit control device and a mobile unit.

BACKGROUND

Conventional car navigation devices (see Japanese Patent Application Publication No. 2004-233175, for example) propose a system in which the device is personified by displaying a character on a display screen, and communicates with the driver by making the character show a humanlike facial expression or gesture, and outputting voice.

SUMMARY

According to the configuration described in the above Japanese Patent Application Publication No. 2004-233175, communication between the driver and the personified device creates an affinity to the mobile unit equipped with the car navigation device, and can thereby increase user satisfaction for the mobile unit.

However, as a precondition of creating an affinity to the mobile unit and increasing user satisfaction for the mobile unit, use of the mobile unit by the user needs to be more frequent.

It is preferable to provide a mobile unit control device and a mobile unit that can prompt a user to use a mobile unit.

First aspect of the mobile unit control device of the present disclosure is a mobile unit control device functioning in a mobile unit including:

a user detector that detects a user located within a first predetermined distance from the mobile unit;

an interest estimation part that estimates an interest that the user detected by the user detector has in the mobile unit; and a response controller that performs interest response processing of, when the interest estimation part estimates that the user is interested in the mobile unit, actuating an accessory included in the mobile unit and changeable in a manner recognizable by the user.

Accordingly, the user detector detects a user approaching the mobile unit and a user inside the mobile unit, and the interest estimation part estimates the user's interest in the mobile unit. When it is estimated that the user is interested in the mobile unit, the response controller performs interest response processing of actuating an accessory changeable in a manner recognizable by the user. The interest response processing makes the user feel like the mobile unit reacted to the user's interest in the mobile unit. This gives the user an incentive for using the mobile unit, and therefore can prompt use of the mobile unit.

The interest estimation part detects a direction of a sight line of the user, and estimates that the user is interested in the mobile unit when the sight line of the user is directed toward the mobile unit.

According to this configuration, it can be estimated that the user is interested in the mobile unit when the user having approached the mobile unit is looking at the mobile unit.

The configuration further includes a usage history information acquisition part that acquires usage history information indicating usage history of the mobile unit by the user, and the response controller performs the interest response processing, when an unused time, which is time elapsed from the last usage of the mobile unit by the user extracted from the usage history information, is equal to or longer than a first predetermined time.

According to this configuration, when the mobile unit is not used by the user for a long time, the interest response processing can be performed at a timing when the user directs the sight line toward the mobile unit. This allows the mobile unit to appeal for use in a more effective manner to the user.

The response controller varies the state of the accessory actuated in the interest response processing more drastically for a longer unused time.

According to this configuration, by varying the state of the accessory actuated in the interest response processing more drastically for a longer unused time, appeal of the mobile unit to the user can be enhanced to prevent further extension of unused time of the mobile unit.

The configuration further includes an emotion estimation part that estimates an emotion of the user, and the response controller performs the interest response processing, when an emotion level of the user estimated by the emotion estimation part is increased.

According to this configuration, the interest response processing can be performed at a timing when it is estimated that the emotion of the user has increased by directing the sight line toward the mobile unit. This allows the mobile unit to appeal for use in a more effective manner to the user.

The response controller varies the state of the accessory actuated in the interest response processing more drastically for a larger increase in the emotion level of the user estimated by the emotion estimation part.

According to this configuration, by varying the state of the accessory actuated in the interest response processing more drastically for a larger increase in the emotion level of the user, a sense of unity between the user and the mobile unit can be increased. Hence, appeal of the mobile unit to the user can be enhanced even more.

The configuration further includes an emotion estimation part that estimates an emotion of the user, and the response controller performs the interest response processing, when an emotion level of the user estimated by the emotion estimation part is equal to or higher than a predetermined level.

According to this configuration, the interest response processing can be performed at a timing when the user directs the sight line toward the mobile unit while the emotion level of the user is estimated to be high. This allows the mobile unit to appeal for use in a more effective manner to the user.

The response controller varies the state of the accessory actuated in the interest response processing more drastically for a higher emotion level of the user estimated by the emotion estimation part.

According to this configuration, by varying the state of the accessory actuated in the interest response processing more drastically for a higher emotion level of the user, a sense of unity between the user and the mobile unit can be increased. Hence, appeal of the mobile unit to the user can be enhanced even more.

The configuration further includes a plan information acquisition part that acquires plan information indicating a plan of the user, and the response controller performs the interest response processing, when the plan information does not indicate any plan of the user within an immediate second predetermined time.

According to this configuration, the interest response processing can be performed at a timing when it is estimated that the user has no plan and therefore can use time freely. This allows the mobile unit to appeal for use in a more effective manner to the user.

The configuration further includes: a mobile unit location detector that detects a location of the mobile unit; and a home information acquisition part that acquires home information indicating a location of the user's home, and in the interest response processing, the response controller actuates an accessory that outputs a sound only when the location of the mobile unit detected by the mobile unit location detector is within a second predetermined distance from the location of the user's home.

According to this configuration, it is possible to prevent annoying the neighbors by actuating the accessory that outputs a sound, when the mobile unit is parked in a location other than home.

The configuration further includes a weather information acquisition part that acquires weather information, and the response controller does not perform the interest response processing, when the weather information indicates that the current weather or weather within an immediate third predetermined time is bad.

According to this configuration, it is possible to prevent needless appeal for using the mobile unit against user's will by performing the interest response processing when the weather is bad (e.g., rain, snow, thunderstorm, strong wind) or may turn bad, and the user is less likely to feel like going out using the mobile unit.

The user detector detects a position of the user relative to the mobile unit, and the response controller selects the accessory actuated in the interest response processing from among the multiple accessories included in the mobile unit, depending on the position of the user relative to the mobile unit.

According to this configuration, For example, if the user is located in front of the mobile unit, headlights may be selected from among accessories of the mobile unit and be flashed as the interest response processing, so that use of the mobile unit can be appealed to the user efficiently.

The configuration further includes a wash detector that detects that the mobile unit is being washed, and the response controller performs the interest response processing, when the wash detector detects that the mobile unit is being washed or it is within a fourth predetermined time from a time point when the wash detector no longer detects that the mobile unit is being washed.

According to this configuration, the interest response processing can be performed when the user's interest in the mobile unit is increased by washing the mobile unit. This allows the mobile unit to appeal for use in a more effective manner to the user.

The embodiments of a mobile unit of the present disclosure includes the above mobile unit control devices.

According to the embodiments, for example, it is possible to implement a mobile unit having the above effects.

BRIEF DESCRIPTION OF THE DRAWINGS

FIG. 6A illustrates a situation where a user and a vehicle are detected by a security camera outside the vehicle, and FIG. 6B illustrates a situation where the user is located in front of the vehicle.

DETAILED DESCRIPTION

An embodiment of the present disclosure will be described with reference to FIGS. 1 to 6B.

1. Configuration of Vehicle Equipped with Mobile Unit Control Device

Figure 1:
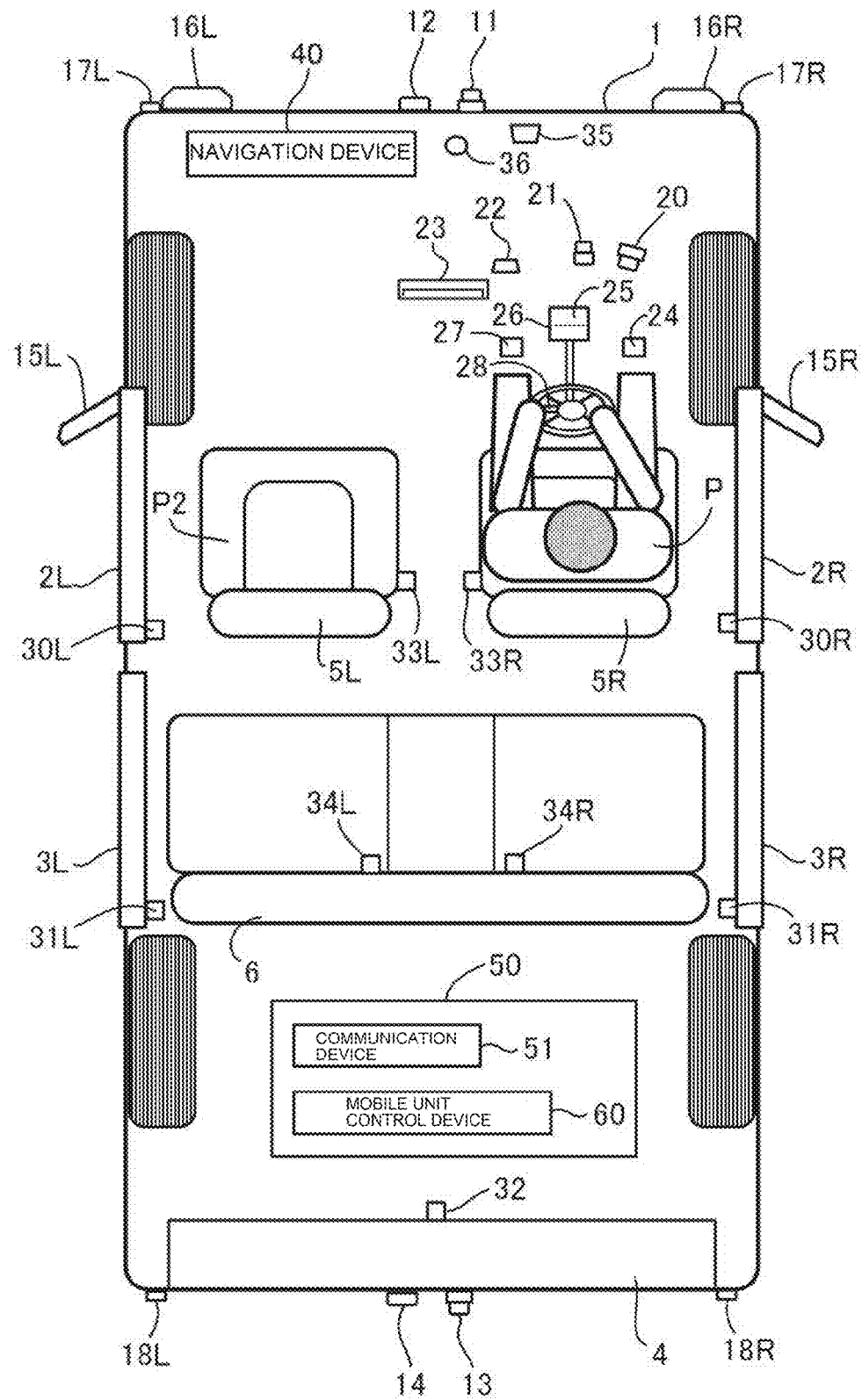
FIG. 1 is an explanatory drawing of a four-wheeled vehicle (mobile unit) equipped with a mobile unit control device of one embodiment.

Referring to FIG. 1, a mobile unit control device 60 is installed in a four-wheeled vehicle 1 (equivalent to mobile unit of present disclosure, hereinafter referred to as vehicle 1). Note that although the embodiment uses an onboard mobile unit control device 60, the mobile unit control device of the present disclosure may be a portable type that can be carried into the vehicle by the user.

FIG. 1 illustrates a situation where a user (driver) P of the vehicle 1 is seated in a driver's seat 5R of the vehicle 1. The vehicle 1 includes, as a configuration for detecting the surrounding state, a front camera 11, a front radar 12, a rear camera 13, and a rear radar 14. The vehicle also includes, as a configuration for acquiring information on the route to a destination, a navigation device 40 (including function of mobile unit location detector of present disclosure) that has a GPS unit 41 and a map DB (database) 42. The vehicle 1 also includes a raindrop sensor 36 that detects rainfall.

The vehicle 1 includes, as a configuration for detecting the state of the driver, a driver's seat camera 20 that takes an image of at least the face part of the driver, and a driver's seat microphone 21 that inputs the voice of the driver.

The vehicle 1 includes, as a configuration for detecting operations to a vehicle operation part by the driver, a steering angle sensor 25 that detects an angle of a steering wheel, a torque sensor 26 that detects a torque applied to the steering wheel, an accelerator pedal sensor 24 that detects a pressing amount of an accelerator pedal, a brake pedal sensor 27 that detects a pressing amount of a brake pedal, and a wiper switch 28 that instructs activation and stop of a windshield wiper (not shown).

The vehicle 1 includes door sensors 30R, 30L, 31R, 31L, 32 that respectively detect opening and closing of front doors 2R, 2L, rear doors 3R, 3L, and a back door 4, and seat sensors 33R, 33L, 34R, 34L that respectively detect whether an occupant is seated on a driver's seat 5R, a passenger's seat 5L, and a rear seat 6. The vehicle 1 also includes a speaker 22 and a display 23 that send a notice to the occupant.

The vehicle 1 includes, as accessories (equivalent to accessory of present disclosure) that make a change that is recognizable by a user located around or inside the vehicle 1, door mirrors 15R, 15L, headlights 16R, 16L, position lamps 17R, 17L, tail lamps 18R, 18L, a horn 35, the speaker 22, and the display 23. Note that other unillustrated usable accessories of the present disclosure include windshield wipers, turn lamps, back lamps, a license plate lamp, and a room lamp.

The vehicle 1 includes a control unit 50 that controls overall operation of the vehicle 1. The control unit 50 is an electronic circuit unit configured of an unillustrated CPU, memory, and interface circuits, for example, and includes a communication device 51 and the mobile unit control device 60.

Image data taken by the front camera 11, rear camera 13, and driver's camera 20, and object location data detected by the front radar 12 and rear radar 14 are input into the control unit 50. Detection signals of the steering angle sensor 25, torque sensor 26, accelerator pedal sensor 24, brake pedal sensor 27, door sensors 30R, 30L, 31R, 31L, 32, seat sensors 33R, 33L, 34R, 34L, and raindrop sensor 36, and operation signals of the wiper switch 28 and other parts are also input into the control unit 50.

A voice signal input into the driver's seat microphone 21 is also input into the control unit 50. The control unit 50 performs communication with the navigation device 40, and uses the communication device 51 to communicate, through a communication network 110, with a user terminal 9 (e.g., smartphone and tablet terminal) owned by the user P, a monitoring system 201 installed in a home of the user P, a customer information server 100 that has a customer DB (database) holding customer data indicating information such as the profile of the user P and history of using the vehicle 1, and a weather forecast server 120 that provides weather forecast information, for example (see FIG. 2).

Control signals output from the control unit 50 control operations of the speaker 22, display 23, communication device 51, navigation device 40, door mirrors 15R, 15L, headlights 16R, 16L, position lamps 17R, 17L, tail lamps 18R, 18L, horn 35 and other components.

2. Configuration of Mobile Unit Control Device

Figure 2:
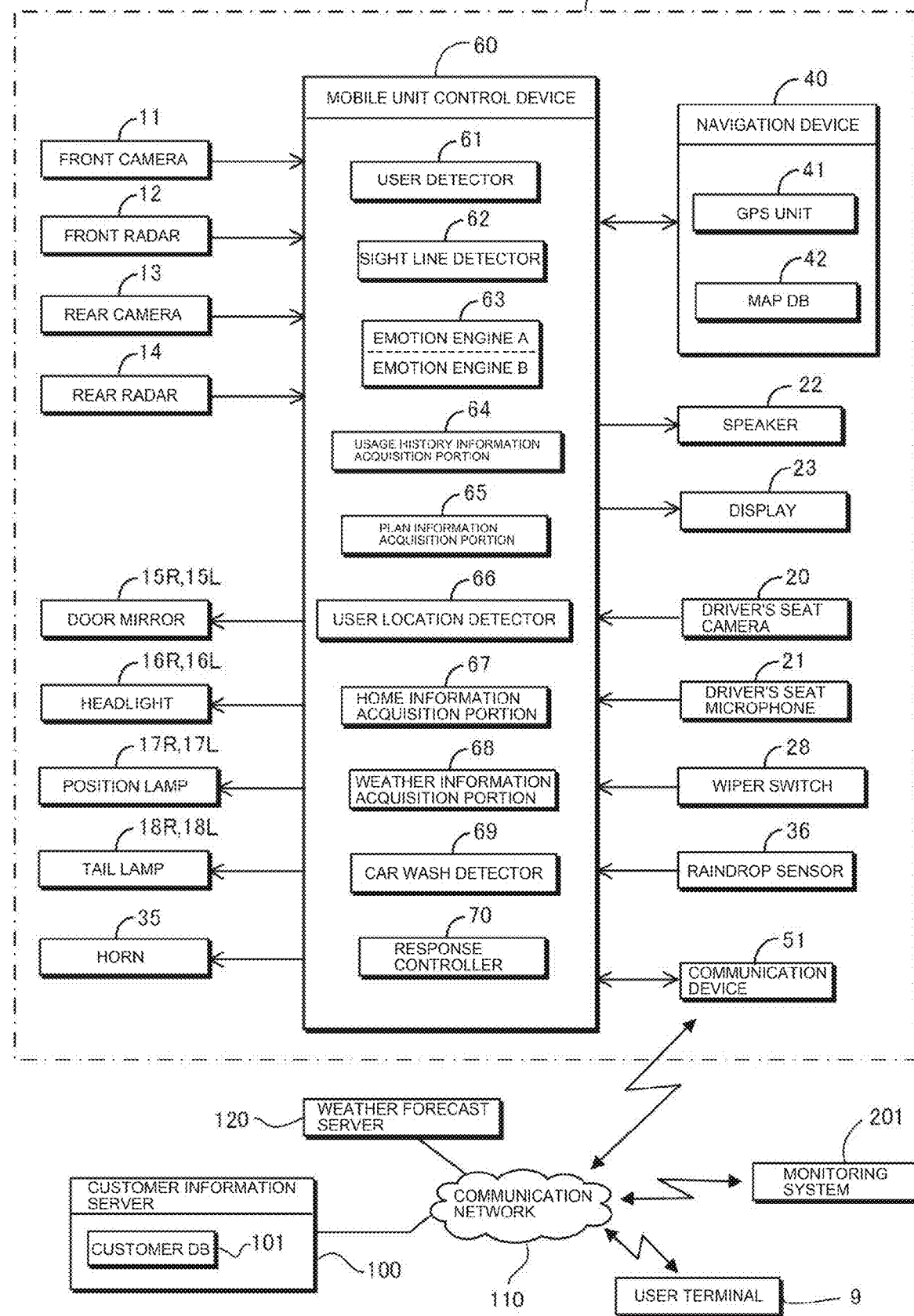
FIG. 2 is a control block chart of the mobile unit control device.

Next, referring to FIG. 2, the mobile unit control device 60 is configured by executing a control program of the mobile unit control device 60, which is stored in a memory of the control unit 50, by a CPU. The mobile unit control device includes: a user detector 61, a sight line detector 62 (equivalent to interest estimation part of present disclosure), an emotion engine 63 (equivalent to emotion estimation part of present disclosure), a usage history information acquisition portion 64, a plan information acquisition portion 65, a user location detector 66, a home information acquisition portion 67, a weather information acquisition portion 68, a car wash detector 69 (equivalent to wash detector of present disclosure), and a response controller 70. Moreover, of these, some or all may be implemented by hardware such as a large scale integration (LSI) or an application specific integrated circuit (ASIC), or may be implemented by a combination of software and hardware.

Figure 6A:
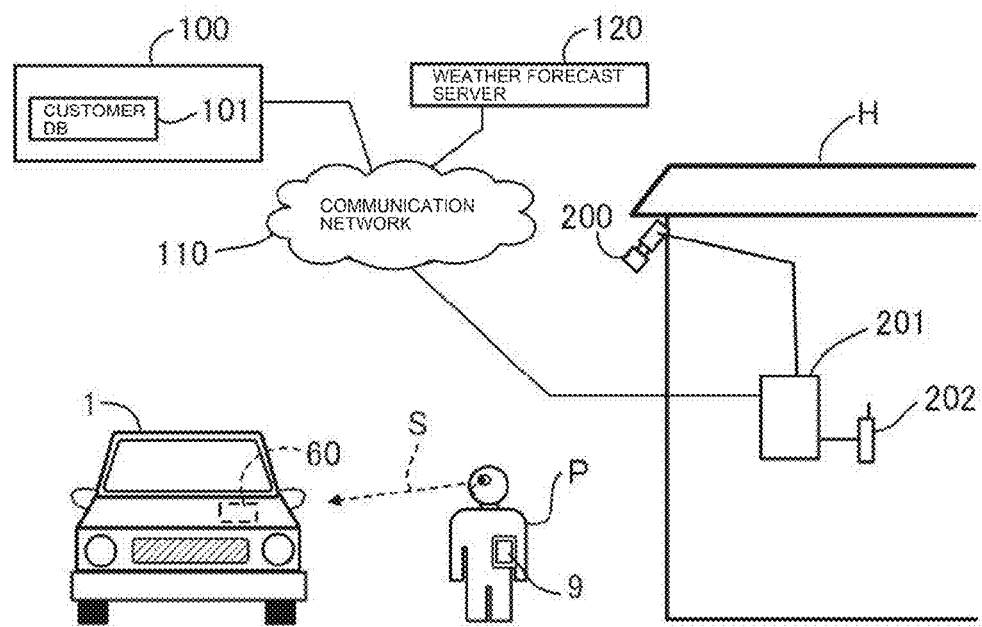
FIGS. 6A and 6B each is an explanatory drawing illustrating operating states of the mobile unit control device.

As illustrated in FIG. 6A, the user detector 61 acquires, by communication through the communication network 110, image data taken by a security camera 200 provided in a home H of the user P, from the monitoring system 201 to which the security camera 200 is connected. Then, the user detector analyzes the image data, and detects the user P located within a first predetermined distance (first predetermined distance is determined by image pickup range of security camera 20) from the vehicle 1.

Note that image data taken by the front camera 11, rear camera 13, and driver's seat camera 20, instead of or in addition to the security camera 200, may also be used to detect the user P. In this case, the total image pickup range of the security camera 200, front camera 11, rear camera 13, and driver's seat camera 20 is the area within the first predetermined distance of the present disclosure.

In this embodiment, the user P is detected by performing pattern matching processing or the like between face image data of the object extracted from the image data, and a face image template of the user P previously held in a memory of the mobile unit control device 60.

The sight line detector 62 extracts a reference point (e.g., corner of eye) and a variable point (e.g., iris) of the eyes of the user P from the face image of the user P, and detects the direction of the sight line based on the position of the variable point relative to the reference point.

The emotion engine 63 is configured of an emotion engine A that estimates the emotion of the user P, and an emotion engine B that personifies the vehicle 1 and generates an emotion of the vehicle 1.

Figure 3:
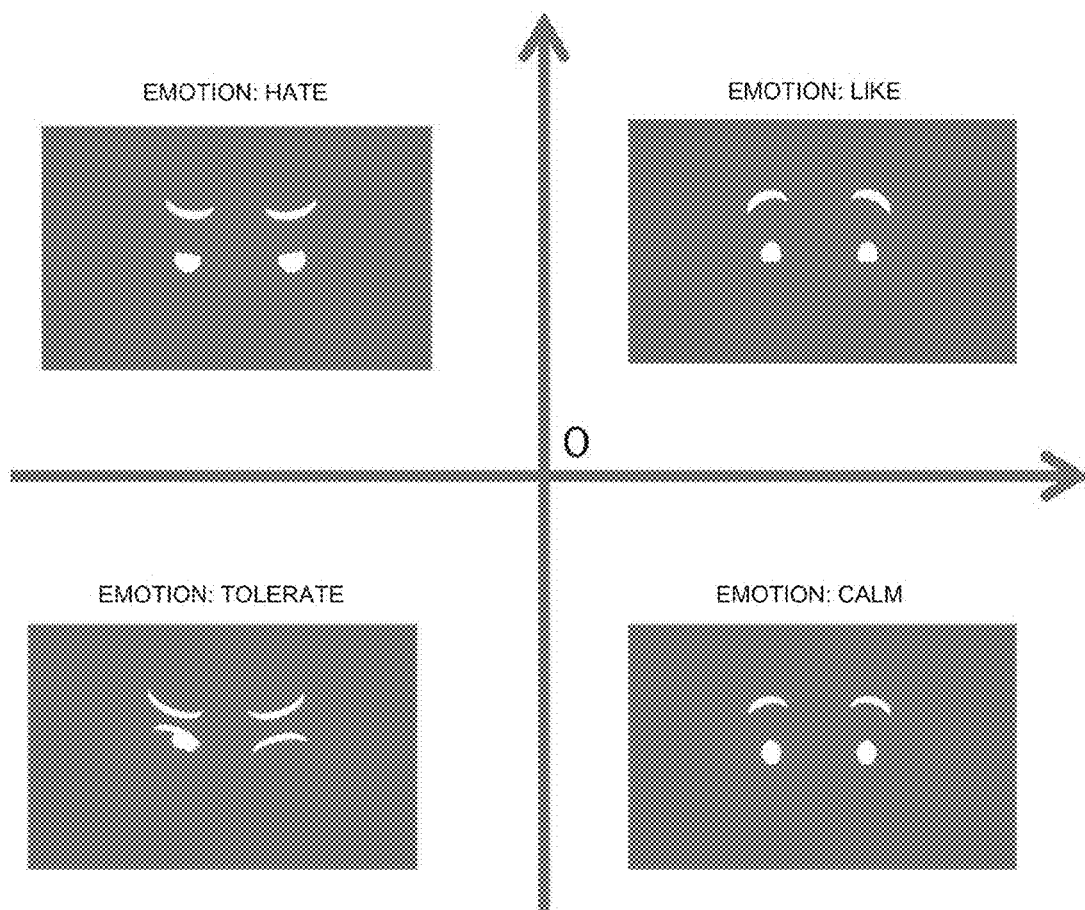
FIG. 3 is an explanatory drawing of an emotion engine.

As illustrated in FIG. 3, the emotion engine A quantifies a facial expression of the user P recognized from image data taken by the security camera 200 (when user P is located outside vehicle 1) or the driver's seat camera 20 (when user P is seated in driver's seat), a tone and accent of the voice of the user P input into the driver's seat microphone 21, operated state of operation parts of the vehicle 1 by the user P, and vehicle information such as ON/OFF of an ignition switch (not shown) of the vehicle 1, actuation of safety systems (not shown) (e.g., actuation of ADAS (Advanced Driver Assistance Systems), ABS (Antilock Brake System), airbags, and emergency call), vehicle speed, and acceleration/deceleration, which are recognized by a CAN (Control Area Network) or the like. The emotion engine A then plots the numerical values on a horizontal axis (gentleness axis) and a vertical axis (normal state axis) as illustrated in FIG. 3.

Then, the emotion engine A estimates and outputs the degree (emotion level) of each emotion (like: first quadrant, hate: second quadrant, tolerate: third quadrant, calm: fourth quadrant) displayed by the user P, based on the quadrant (first quadrant: like, second quadrant: hate, third quadrant: tolerate, fourth quadrant: calm) to which the plotted dot belongs and the position of each dot in its quadrant.

Note that although the emotion engine A of the embodiment estimates the emotion level of the user P by using the facial expression of the user P, the voice of the user P, operated states of operation parts of the vehicle 1, and vehicle information on the vehicle 1, the emotion of the user P can be estimated by using at least the facial expression of the user.

Figure 6B:
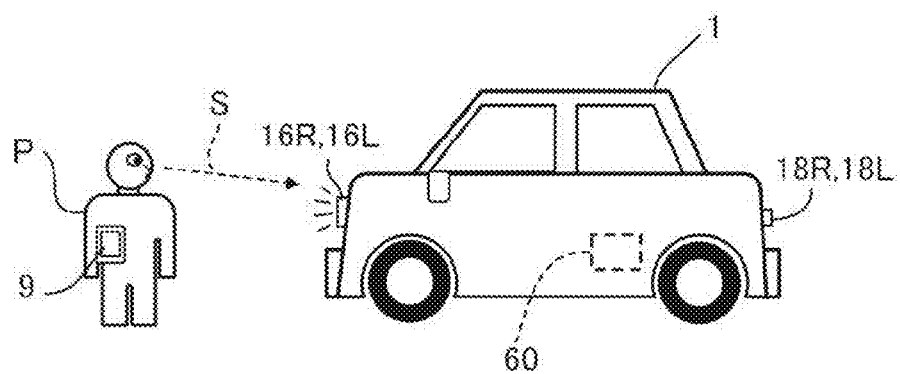

As illustrated in FIGS. 6A and 6B, when the user P is located outside the vehicle 1, the emotion engine A estimates the emotion level of the user on the basis of the facial expression of the user P extracted from the image data of the security camera 200.

The emotion engine B quantifies operated states of operation parts of the vehicle 1 and vehicle information, for example, and plots them on the horizontal axis (gentleness axis) and the vertical axis (normal state axis) illustrated in FIG. 3, as in the case of the emotion engine A. Then, the emotion engine B generates and outputs a degree (emotion level) of each emotion (like, hate, tolerate, calm) of the personified vehicle 1, based on the quadrant to which the plotted dot belongs and the position of the dot in its quadrant.

The usage history information acquisition portion 64 uses the communication device 51 to access the customer information server 100 through the communication network 110, and acquires customer data (including usage history information) on the user P from the customer DB 101. Then, the usage history information acquisition portion calculates the time (unused time) elapsed from the last usage of the vehicle 1, by referring to the usage history of the vehicle 1 by the user P included in the customer data.

The plan information acquisition portion 65 uses the communication device 51 to access the user terminal 9 or the customer information server 100 through the communication network 110, and acquires the user P's plan information.

The user location detector 66 uses the communication device 51 to access the user terminal 9 through the communication network 110, and acquires information on the location of the user P detected by GPS (Global Positioning System) included in the user terminal 9.

The home information acquisition portion 67 uses the communication device 51 to access the customer information server 100 through the communication network 110, and acquires the user P's customer data (including home information) from the customer DB 101. Then, the home information acquisition portion acquires information on the location of the user P's home H included in the customer data.

The weather information acquisition portion 68 uses the communication device 51 to access the weather forecast information server 120 through the communication network 110, and acquires information on the current weather around the current location of the user P, and the forecast of weather within a third predetermined time.

The car wash detector 69 detects that the vehicle 1 is being washed. The car wash detector 69 detects that the vehicle 1 is being washed when the wiper switch 28 is OFF (wiper stop instructed state) while the raindrop sensor 36 is ON (raindrop detected state), and when the weather of the location around the user P acquired by the weather information acquisition portion 68 is detected to be fair while the raindrop sensor 36 is ON.

The response controller 70 performs "sight line response processing" (equivalent to "interest response processing" of present disclosure) in which the vehicle 1 appeals for use to the user by actuating accessories of the vehicle 1, when the sight line detector 62 detects that the sight line of the user P is directed toward the vehicle 1 (it is estimated that user P has interest in vehicle 1).

3. Sight Line Response Processing

Next, "sight line response processing" performed by the response controller 70 will be described according to flowcharts illustrated in FIGS. 4 and 5. The response controller 70 repeats the processing of the flowcharts illustrated in FIGS. 4 and 5 at predetermined control cycles when the vehicle 1 is parked.

Figure 4:
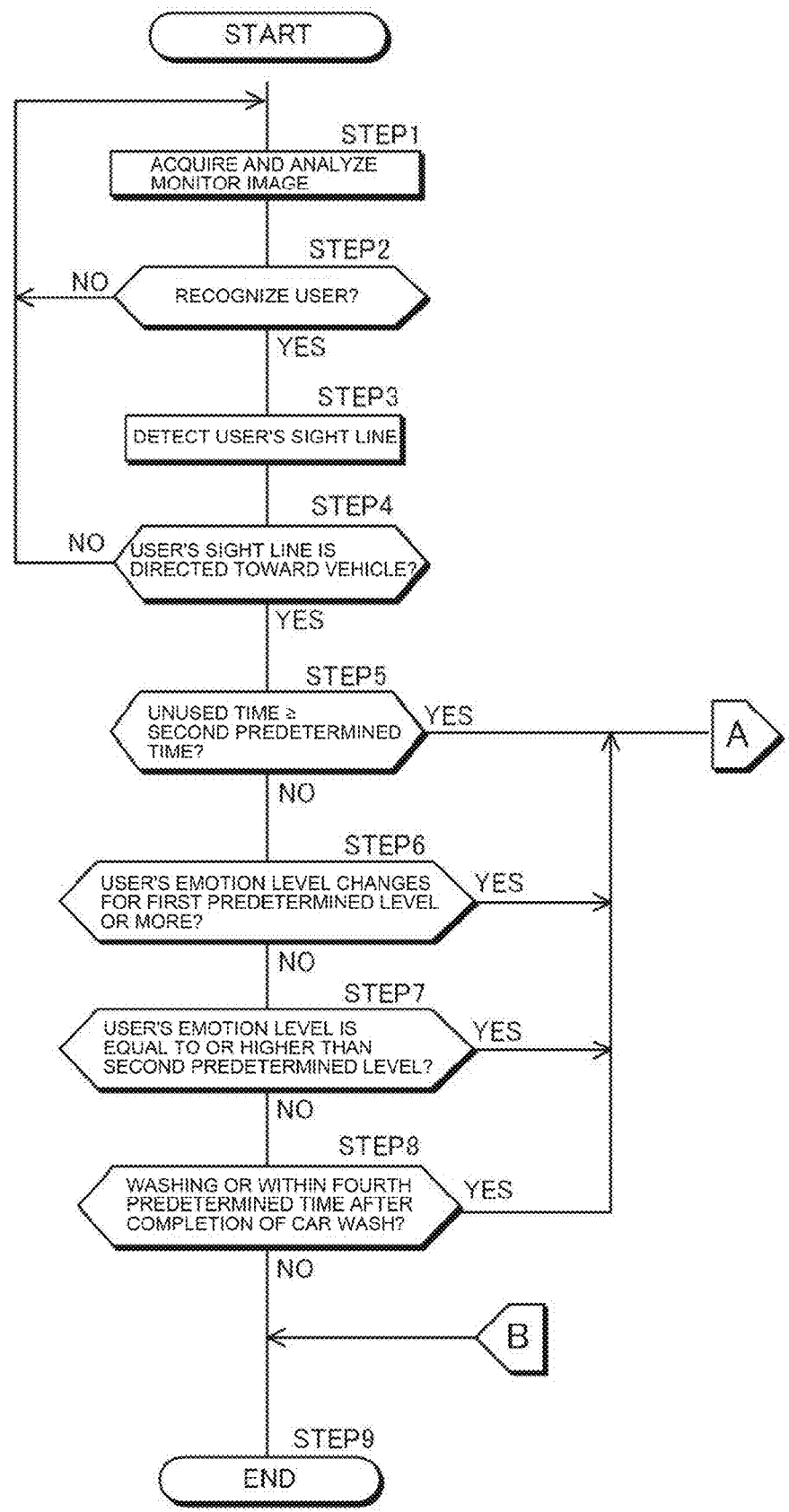
FIG. 4 is a first flowchart of the mobile unit control device.

STEP 1 of FIG. 4 is processing performed by the user detector 61. As illustrated in FIG. 6A, when the vehicle 1 is parked, the user detector 61 communicates with the monitoring system 201 to acquire image data taken by the nearby security camera 200 (installed in home H of user P in example of FIG. 6A). The communication between the mobile unit control device 60 and the monitoring system 201 may be performed through the communication network 110, or may be performed through a wireless LAN formed by a wireless router 202.

The user detector 61 analyzes the image data and searches for the user P. If the user detector recognizes the user P, the processing proceeds to STEP 3, and if it does not detect the user P, the processing branches to STEP 1.

The following STEP 3 is processing performed by the sight line detector 62, and the sight line detector 62 detects the direction of a sight line S of the user P by the aforementioned processing. The next STEPS 5 to 8 and STEPS 20 to 24, 30 of FIG. 5 are processing performed by the response controller 70.

In STEP 5, the response controller 70 determines whether an unused time calculated by the usage history information acquisition portion 64 is equal to or longer than a second predetermined time. If the unused time is equal to or longer than the second predetermined time, the processing branches to STEP 20 of FIG. 5, and if the unused time is shorter than the second predetermined time, the processing proceeds to STEP 6.

In STEP 6, the response controller 70 determines whether an emotion level (e.g., emotion level of "like") of the user P estimated by the emotion engine A has increased by a first predetermined level or more (increased). If the emotion level of the user P has increased by the first predetermined level or more, the processing branches to STEP 20 of FIG. 5, and if the emotion level did not increase by the first predetermined level or more, the processing proceeds to STEP 7.

In STEP 7, the response controller 70 determines whether the emotion level (e.g., emotion level of "like") estimated by the emotion engine A is equal to or higher than a second predetermined level. If the emotion level of the user P is equal to or higher than the second predetermined level, the processing proceeds to STEP 20 of FIG. 5, and if the emotion level is lower than the second predetermined level, the processing proceeds to STEP 8.

In STEP 8, the response controller 70 determines, according to the car wash detector 69, whether the vehicle 1 is being washed or it is within a fourth predetermined time after completion of the car wash. If the vehicle 1 is being washed or it is within the fourth predetermined time after completion of the car wash, the processing proceeds to STEP 20 of FIG. 5, and if the vehicle 1 is not being washed and it is not within the fourth predetermined time after completion of the car wash, the processing proceeds to STEP 20 and is terminated.

Figure 5:
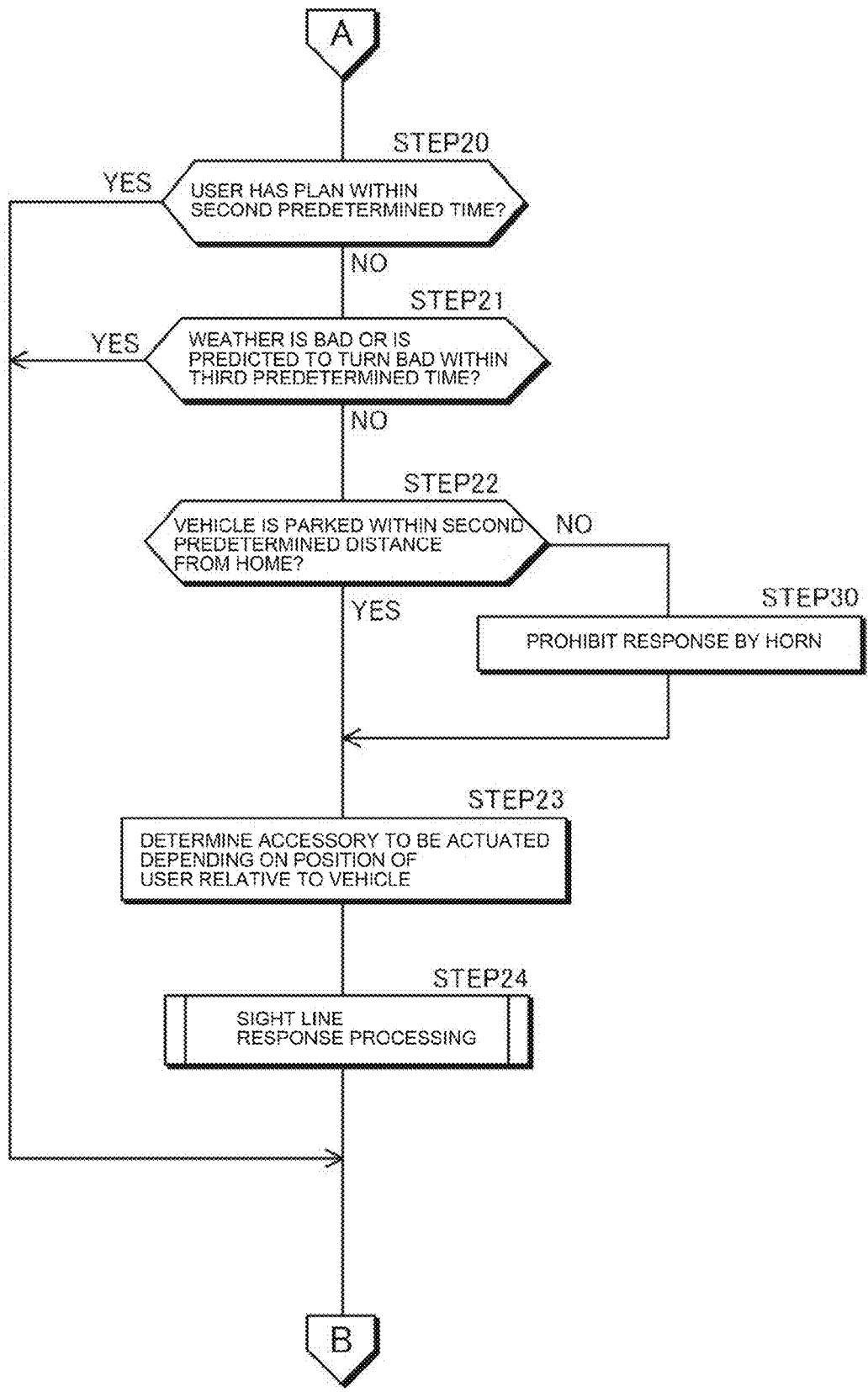
FIG. 5 is a second flowchart of the mobile unit control device.

In STEP 20 of FIG. 5, the response controller 70 refers to plan information of the user P acquired by the plan information acquisition portion 65, and determines whether the user P has a plan within a second predetermined time from now. If the user P has a plan, the user P is less likely to use the vehicle 1, and therefore appealing may give a bad impression on the user P. Hence, in this case "sight line response processing" of STEP 24 is not performed, and the processing branches to STEP 9 of FIG. 4 to be terminated.

In the next STEP 21, the response controller 70 refers to weather information acquired from the weather information acquisition portion 68, and determines whether the current weather around the current location of the vehicle 1 is bad (e.g., rain, snow, thunderstorm, strong wind) or will be bad within a third predetermined time. If the current weather is bad or will be bad within the third predetermined time, the user P is less likely to feel like going out on the vehicle 1. Hence, appealing may give a bad impression on the user P.

Accordingly, in this case "sight line response processing" of STEP 24 is not performed, and the processing branches to STEP 9 of FIG. 4 to be terminated. Meanwhile, if the current weather is not bad, and it is predicted to not turn bad within the third predetermined time, the processing proceeds to STEP 22.

In STEP 22, the response controller 70 refers to the current location of the vehicle 1 detected by the navigation device 40 and a home address of the user P acquired by the home information acquisition portion 67, and determines whether the vehicle 1 is parked within a second predetermined distance from home (on own property).

If the vehicle 1 is parked within the second predetermined distance from home, the processing proceeds to STEP 23. Meanwhile, if the vehicle 1 is parked farther away from home than the second predetermined distance, the processing branches to STEP 30, the response controller 70 prohibits response by the horn 35 in the sight line response processing, and proceeds to STEP 23. This can prevent annoying the neighbors by sounding the horn 35 in a location other than home.

In the following STEP 23, the response controller 70 selects the accessory of the vehicle 1 to be actuated in "sight line response processing," depending on the position of the user P relative to the vehicle 1 detected by the user detector 61. For example, as illustrated in FIG. 6B, if the user P is located in front of the vehicle 1, the headlights 16R, 16L may be flashed while keeping the tail lamps 18R, 18L off, so that the vehicle 1 can appeal to the user P efficiently.

In the next STEP 24, the response controller 70 performs "sight line response processing." The response controller 70 performs "sight line response processing" of actuating, among accessories of the vehicle 1, the accessory whose changed state is recognizable from outside the vehicle 1, at a timing when it is detected that the sight line of the user P is directed toward the vehicle 1 (timing when user P looks at vehicle 1) in STEP 4. Thus, the vehicle 1 appeals for use of the vehicle 1 to the user P.

As mentioned earlier, in "sight line response processing," the response controller 70 actuates the door mirrors 15R, 15L, headlights 16R, 16L, position lamps 17R, 17L, tail lamps 18R, 18L, horn 35, speaker 22, and display 23, for example, to appeal for use to the user.

According to the processing of STEPS 5 to 8, when the sight line of the user P is directed toward the vehicle 1, "sight line response processing" is performed in the following cases.

(1) Unused Time of Vehicle 1 is Equal to or Longer than Second Predetermined Time (STEP 5)

In this case, the vehicle 1 can appeal to prompt use to the user P, at the timing when the unused time becomes long. The state of the accessory may be varied more drastically for a longer unused time. For example, when flashing the headlights 16R, 16L, the headlights 16R, 16L may be made brighter or flashed for a larger number of times for a longer unused time.

(2) When Emotion Level of User P has Changed by First Predetermined Level or More (STEP 6)

In this case, the vehicle 1 can appeal to prompt use to the user P, at the timing when the emotion of the user P has increased by looking at the vehicle 1. The state of the accessory may be varied more drastically for a larger increase in the emotion level. For example, when flashing the headlights 16R, 16L, the headlights 16R, 16L may he made brighter or flashed for a larger number of times for a larger change in the emotion level.

(3) When Emotion Level of User P is Equal to or Higher than Second Predetermined Level (STEP 7)

In this case, the vehicle 1 can appeal to prompt use to the user P, at the timing when the user P looks at the vehicle 1 in a highly emotional state. The state of the accessory may be varied more drastically for a higher emotion level. For example, when flashing the headlights 16R, 16L, the headlights 16R, 16L may he made brighter or flashed for a larger number of times for a higher emotion level.

(4) When Washing or within Fourth Predetermined Time after Completion of Car Wash (STEP 8)

In this case, the vehicle 1 can appeal to prompt use to the user P, at the timing when the user P is feeling satisfaction and exaltation by washing the vehicle 1.

4. Other Embodiments

In the above embodiment, "sight line response processing" is performed in STEP 24 when any of conditions of STEPS 5 to 8 is satisfied. However, instead of providing these conditions, "sight line response processing" of STEP 24 may be performed unconditionally when it is detected that the sight line of the user P is directed toward the vehicle 1 in STEP 4.

An execution condition of "sight line response processing" may be set by combining the conditions of STEPS 5 to 8. Additionally, some or all of the conditions of STEPS 20, 21, 22 may be omitted.

Although the accessory of the vehicle 1 to be actuated in "sight line response processing" is selected depending on the position of the user P relative to the vehicle 1 in STEP 23 of FIG. 5 in the above embodiment, the accessory to be actuated in "sight line response processing" may be fixed.

Although the sight line detector 62 is provided as the interest estimation part of the present disclosure in the above embodiment, the user P's interest in the vehicle 1 may be estimated by elements other than the sight line. For example, it may be estimated that the user P is interested in the vehicle 1 when the user P stands close to the vehicle 1, from the behavior of the user P (e.g., when user P is washing vehicle 1), when the user P and his/her friend are speaking about the vehicle 1 (this state is detectable by analyzing voice input into the driver's seat microphone 21), when the user P is cleaning the interior of the vehicle 1, and other situations. Note that the behavior of the user P is detectable by image data taken by the security camera 200 and the onboard cameras 11, 13, 20, and sound data collected by the driver's seat microphone 21, for example.

Although the four-wheeled vehicle 1 is used as the mobile unit of the present disclosure in the above embodiment, the disclosure is also applicable to various mobile units including other types of vehicles such as a two-wheeled vehicle, ships, and aircrafts. Although a specific form of embodiment has been described above and illustrated in the accompanying drawings in order to be more clearly understood, the above description is made by way of example and not as limiting the scope of the invention defined by the accompanying claims. The scope of the invention is to be determined by the accompanying claims. Various modifications apparent to one of ordinary skill in the art could be made without departing from the scope of the invention. The accompanying claims cover such modifications.

The invention claimed is:

1. A mobile unit control device functioning in a mobile unit comprising:
   a user detector processor that detects a user located within a first predetermined distance from said mobile unit;

an interest estimation processor configured to estimate whether the user detected by said user detector processor is interested in said mobile unit;

a response processor that performs interest response processing of, when said interest estimation processor estimates that said user is interested in said mobile unit, actuating an accessory provided in said mobile unit to change in a manner recognizable by said user; and a usage history information acquisition processor that acquires usage history information indicating usage history of said mobile unit by said user, wherein said response processor determines whether an unused time, which is time elapsed from the last usage of said mobile unit by said user extracted from said usage history information, is equal to or longer than a first predetermined time, and if so, performs said interest response processing.

2. The mobile unit control device according to claim 1, wherein said interest estimation processor detects a direction of a sight line of said user, and estimates that said user is interested in said mobile unit when the sight line of said user is directed toward said mobile unit.

3. The mobile unit control device according to claim 1, wherein said response processor varies the state of said accessory actuated in said interest response processing more drastically as the unused time becomes longer.

4. The mobile unit control device according to claim 1 further comprising an emotion estimation controller that estimates an emotion of said user, wherein said response processor performs said interest response processing, when an emotion level of said user estimated by said emotion estimation controller is increased.

5. The mobile unit control device according to claim 4, wherein said response processor varies the state of said accessory actuated in said interest response processing more drastically with a larger increase in the emotion level of said user estimated by said emotion estimation controller.

6. The mobile unit control device according to claim 1 further comprising an emotion estimation controller that estimates an emotion of said user, wherein said response processor performs said interest response processing, when an emotion level of said user estimated by said emotion estimation part is equal to or higher than a predetermined level.

7. The mobile unit control device according to claim 6, wherein said response processor varies the state of said accessory actuated in said interest response processing more drastically with a higher emotion level of said user estimated by said emotion estimation part.

8. The mobile unit control device according to claim 1 further comprising a plan information acquisition controller that acquires plan information indicating a plan of said user, wherein said response processor avoids performing said interest response processing, when said plan information acquired indicates that said user has a plan within an immediate second predetermined time.

9. The mobile unit control device according to claim 1 further comprising:

a mobile unit location processor detector that detects a location of said mobile unit; and a home information acquisition controller that acquires home information indicating a location of said user's home, wherein in said interest response processing, said response processor actuates an accessory to output a sound when the location of said mobile unit detected by said mobile unit location processor is within a second predetermined distance from the location of said user's home, and said response processor prevents the accessory from outputting the sound when the location of said mobile unit detected by said mobile unit location processor is not within the second predetermined distance from the location of said user's home.

10. The mobile unit control device according to claim 1 further comprising a weather information acquisition controller that acquires weather information, wherein said response processor avoids performing said interest response processing, when said weather information indicates that the current weather or weather within an immediate third predetermined time is bad.

11. The mobile unit control device according to claim 1, wherein:

said user detector processor detects a position of said user relative to said mobile unit, the accessory includes a plurality of accessories; and said response processor selects at least one of said accessories to be actuated in said interest response processing from among the plurality of said accessories included in said mobile unit, depending on said position of said user relative to said mobile unit.

12. The mobile unit control device according to claim 1 further comprising a wash detector that detects that said mobile unit is being washed, wherein said response processor performs said interest response processing, when said wash detector detects that said mobile unit is being washed or it is within a fourth predetermined time from a end time point of the wash when said wash detector ends detection that said mobile unit is being washed.

13. A mobile unit comprising the mobile unit control device according to claim 1.

14. The mobile unit control device according to claim 1, wherein the mobile unit is a vehicle.

15. The mobile unit control device according to claim 1, wherein the interest estimation processor analyzes behavior of the user to estimate whether the user detected by said user detector processor is interested in said mobile unit.

16. The mobile unit control device according to claim 4, wherein the emotion level is a level of positive emotion.

17. The mobile unit control device according to claim 6, wherein the emotion level is a level of positive emotion.

18. A mobile unit control method to control a mobile unit, the method comprising steps of:

(i) detecting, by using a computer, a user located within a first predetermined distance from the mobile unit;

(ii) estimating, by using the computer, whether the user detected by step (i) is interested in said mobile unit;

(iii) performs, by using the computer, interest response processing of, when it is estimated that said user is interested in said mobile unit, actuating an accessory provided in said mobile unit to change in a manner recognizable by said user; and (iv) acquiring, by using the computer, usage history information indicating usage history of said mobile unit by said user, wherein said step (iii) determines whether an unused time, which is time elapsed from the last usage of said mobile unit by said user extracted from said usage history information, is equal to or longer than a first predetermined time, and if so, performs said interest response processing.

* * * * *